United States Patent [19]

Kuntz

[11] 4,135,304
[45] Jan. 23, 1979

[54] PROFILE INDICATING SYSTEM FOR ROADWAYS

[75] Inventor: Leland E. Kuntz, Arlington Heights, Ill.

[73] Assignee: Honeywell Inc., Minneapolis, Minn.

[21] Appl. No.: 639,672

[22] Filed: Dec. 11, 1975

[51] Int. Cl.² ............................................. G01B 07/28
[52] U.S. Cl. ................................. 33/174 P; 33/1 LE; 33/174 L
[58] Field of Search .............. 33/1 LE, 174 R, 174 L, 33/174 P, 174 PA, 331, 333; 404/84

[56] References Cited

U.S. PATENT DOCUMENTS

| 2,344,216 | 3/1944 | Raydon | 33/174 R |
| 3,210,710 | 10/1965 | Amos | 404/84 |
| 3,285,148 | 11/1966 | Munyon | 404/84 |
| 3,675,545 | 7/1972 | Anderson et al. | 33/174 R |
| 3,797,124 | 3/1974 | Easterling et al. | 33/331 |
| 3,813,181 | 5/1974 | Barnes, III | 404/84 |

FOREIGN PATENT DOCUMENTS 949062 2/1964 United Kingdom ................... 33/174 P Primary Examiner—Richard R. Stearns
Attorney, Agent, or Firm—Trevor B. Joike

[57] ABSTRACT

A system for indicating or recording the profile of a roadway is disclosed having a support which can be mounted on a vehicle to travel along the roadway, grade sensors mounted on the support for providing a proportional signal indicative of the elevation of selected points along the roadway, recording or indicating means for providing a proportional indication of the elevation of the selected points and means for stabilizing the support.

6 Claims, 4 Drawing Figures

PROFILE INDICATING SYSTEM FOR ROADWAYS

This invention relates to indicating and/or recording the profile of a finished or an unfinished roadway and more specifically to the proportional indicating and/or recording of such a profile.

In the past, various machines have been devised for preparing and paving or otherwise surfacing roadbeds with various degrees of success. In view of modern day highway speeds, however, it is imperative that roadways be finished with a high degree of accuracy to avoid any undesired variations in slope and grade. To insure that roadways under construction have the desired slope and grade, periodic checks have to be made.

The prior art has made several attempts at providing such checks including using various level type systems and optical checking schemes. One of the latest attempts involves the use of a plurality of grade sensors operating in conjunction with an associated plurality of switches and lights to indicate whether the sensed point is above grade, on grade, or below grade. This type of system tends to be inaccurate between the highgrade and lowgrade conditions, i.e. no indication is given of the exact grade as long as the grade is between the high and low limits. Moreover, the platform from which the grade sensors depend is not necessarily stabilized in the slope and grade axes. Another failing of this prior art system is that it does not provide a permanent record of the profile of the roadbed being monitored as the platform is moved therealong.

SUMMARY OF THE INVENTION

The present system eliminates the inaccuracy that prior art systems have suffered by providing a proportional indication of the deviation from normal or the preselected reference of the roadway being monitored. The present invention also provides for an accurate indication of the profile of the roadway by stabilizing the support from which the grade sensors depend in both the slope and grade axes and to provide a permanent record of that profile of the roadway as the support is moved therealong.

BRIEF DESCRIPTION OF THE DRAWING

These and other advantages of the present invention will become manifest from a detailed consideration of the drawings in which.

DETAILED DESCRIPTION OF THE DRAWINGS

Figure 1:
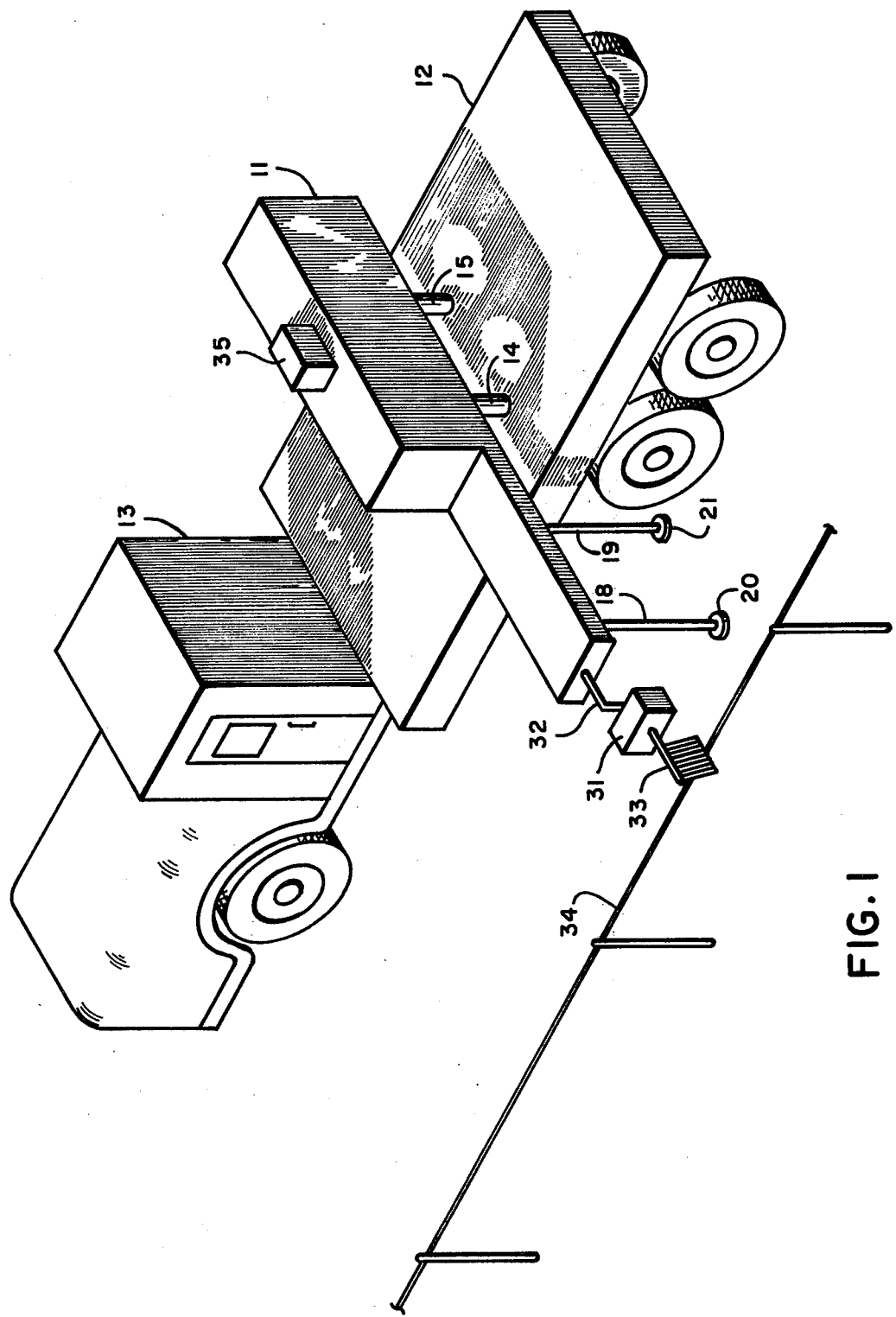
FIG. 1 is a perspective view of the vehicle mounted platform from which the grade sensors depend.
Figure 2:
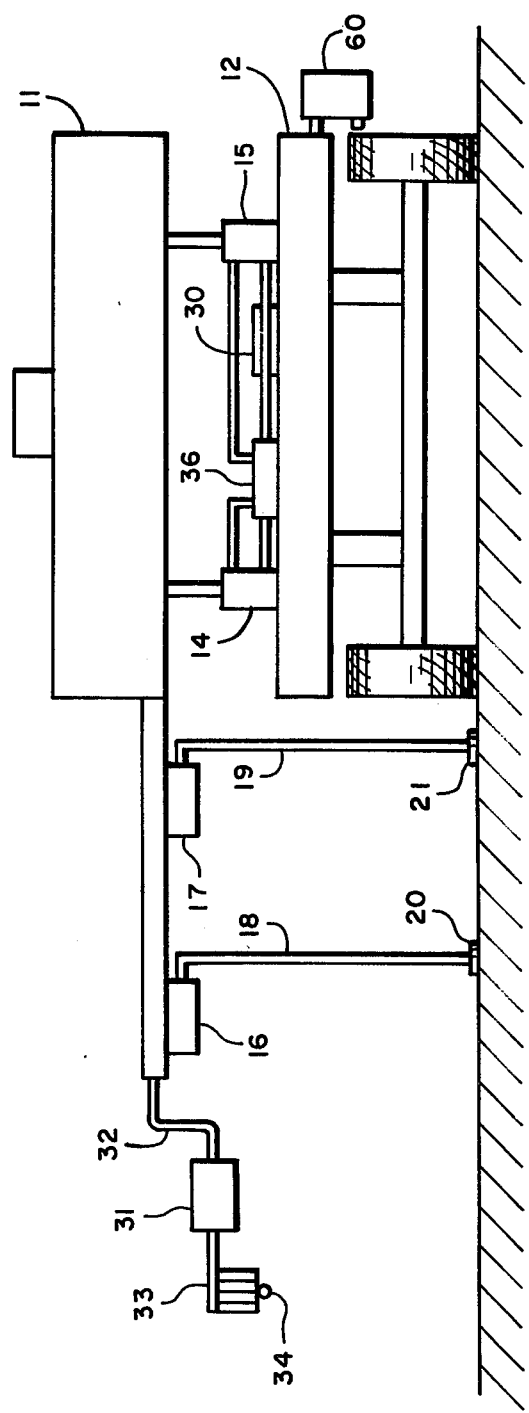
FIG. 2 is a rear view of the platform and sensing structure mounted on a flatbed portion of the truck shown in FIG. 1.

In FIGS. 1 and 2, a support 11 is mounted on the flatbed portion 12 of a truck or similar vehicle 13. Support 11 is supported on the flatbed 12 by hydraulic rams 14 and 15. In order to indicate or record the profile of the finished or unfinished roadway, grade sensors 16 and 17 are suitably attached to the support 11 and have corresponding sensing arms 18 and 19 depending therefrom. At the end of the sensing arms 18 and 19 are corresponding pads 20 and 21 which rest on the finished or unfinished roadway to be sensed. Although this sensing arrangement 16–21 can be mounted to the rear of the vehicle to sense the roadway traversed by the vehicle, the embodiment of FIG. 2 shows the sensors attached along side the vehicle to sense the profile of the adjacent roadway.

Figure 4:
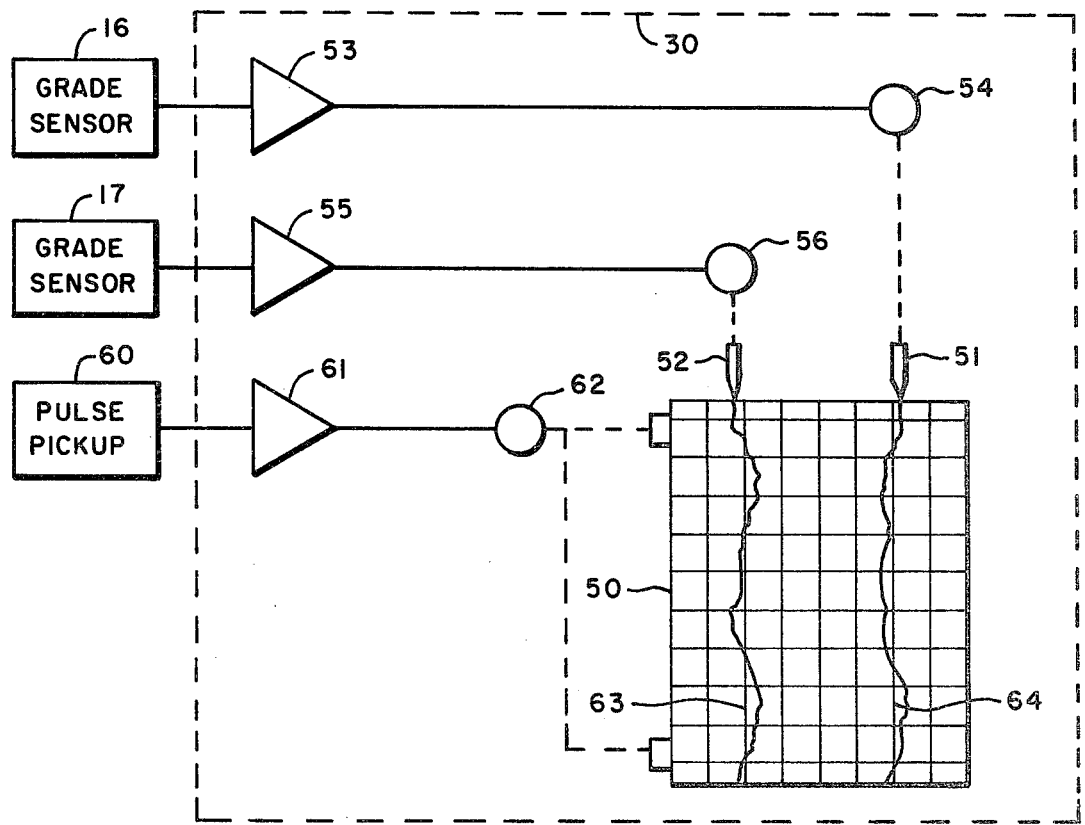
FIG. 4 shows the recording mechanism.

The sensing arms 18 and 19 are adapted to operate microsyns, potentiometers or the like within the grade sensors 16 and 17. Grade sensors 16 and 17 are connected, as shown in FIG. 4, to a recording device 30 for providing an indication or permanent record of the profile of the roadway being sensed. Although only two grade sensors 16 and 17 have been shown, more grade sensors can be used if a more accurate representation of the profile of the roadway is needed.

In order to accurately measure the profile of the roadway, the support 11 is stabilized in both the slope and grade axes to prevent any grade and slope deviations imposed upon the vehicle from being reflected into the indicating or recording device. The achieve this control, the support 11 has a grade sensor 31 connected thereto by a support arm 32. The grade sensor 31 has a grid 33 for sensing an external reference such as a stringline 34. Although a stringline is shown, any other form of grade reference device, such as an optical or laser system, can be utilized. A slope sensor 35 is mounted on the support to provide control in the slope axis. The output from the grade sensor 31 and the slope sensor 35 are connected to a control apparatus 36 which drives the hydraulic rams 14 and 15 to maintain the support 11 at the desired grade and slope.

Figure 3:
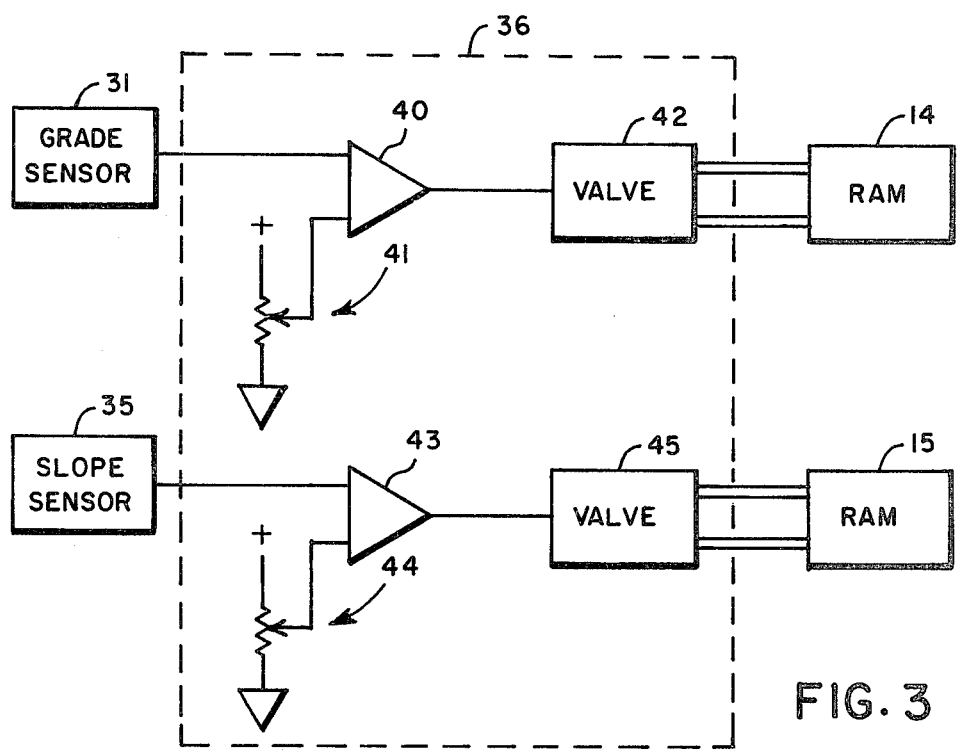
FIG. 3 shows the grade and slope control for the platform.

FIG. 3 shows the control system responsive to the grade sensor 31 and the slope sensor 35 for maintaining a support at the desired grade of slope. The grade sensor 31 is connected to one input terminal of an amplifier 40 the other input terminal of which is connected to a grade setpoint device 41. The output of the amplifier drives a valve 42 which controls a supply of hydraulic fluid to the ram 14. The slope sensor 35 is connected to one input terminal of an amplifier 43 the other input terminal of which is connected a slope setpoint device 44. The output of the amplifier 43 is connected to valve 45 which controls the supply of hyraulic fluid to the ram 15. The grade sensor may be an SB104, the amplifiers 40 and 43 may be the R7232 and the valves 42 and 45 may be V7059 all of which are manufactured by the assignee of this application. The slope sensor 35 maybe of the type shown in U.S. Pat. No. 3,674,094. All of these devices are proportional devices adapted to produce a proportional signal upon a change of condition.

If the slope sensor senses a change in slope of the support 11, it produces a signal to the amplifier 43 which is proportional to the deviation from the desired slope as established by potentiometer 44. The amplifier 43 then produces a proportional signal to the valve 45 which adjusts the ram 15 by an according amount to correct for the deviation in the slope. If the grade sensor 31 and grid 33 sense a deviation of the support 11 from the reference grade as established by the stringline 34, the grade sensor 31 produces a signal proportional to that deviation and supplies the signal to the amplifier 40. The amplifier 40 produces an output signal which is proportional to the deviation of the signal produced by grade sensor 31 from the desired grade established by potentiometer 41 to the valve 43 which adjusts the ram 14 to correct for the deviation in grade. As the ram 14 adjusts the support 11, any change in slope as a result of this adjustment is sensed by the slope sensor 35 to provide a corresponding adjustment of the hydraulic ram 15. In this manner, the support 11 is stabilized in both the slope and grade axes.

The recording device 30, as shown in more detail in FIG. 4, comprises a stripchart 50 having recording pens 51 and 52 for providing a permanent record of the profile of the road. Although only two recording pens 51 and 52 have been shown just as only two grade sensors 16 and 17 have been shown, more can be provided if a more detailed profile of the roadway is necessary. The grade sensor 16 provides an output signal to amplifier 53 which in turn produces an output signal to motor 54 which drives recording pen 51 and grade sensor 17 provides an output signal to amplifier 55 which in turn produces an output signal to motor 56 which drives recording pen 52. The grade sensors 16 and 17 may be SB104's and amplifiers 53 and 55 may be R7232's both of which are adapted to provide proportional signals to the motors 54 and 56.

In order to drive the chart 50 at a speed which is proportional to the speed of the vehicle, a pulse pickup unit 60 is mounted from the flatbed portion 12 of the truck and senses the rotation of the wheels. A magnetic element may be positioned on the wheel and a corresponding sensor head may be placed on the pickup sensing unit 60 in accordance with the system shown in U.S. Pat. No. 3,674,177. The pulse pickup unit 60 and amplifier 61 are designed, as shown in the above U.S. Pat. No. 3,674,177, to provide an output signal which is proportional to the speed at which the wheels of the flatbed portion of the truck rotate. This signal is supplied to a motor 62 which drives the supply and takeup reels for the chart 50.

As the vehicle moves alongside the roadway to be sensed, the pulse pickup unit 60 senses the speed of the vehicle and drives the chart 50 accordingly. As the pads 20 and 21 sense deviations in the roadway, they transmit these deviations to the grade sensors 16 and 17 which provide output signals proportional to these deviations. These proportional signals then drive the motors 54 and 56 to move the recording pens 51 and 52 transversely across the chart 50 to provide a permanent record of the deviation of the roadway being sensed. As seen in FIG. 4, sample profiles are shown.

When the system is initially set up to begin a profile measurement, the sensing arms 18 and 19 and corresponding sensing pads 20 and 21 are lowered to the roadway. The sensors 16 and 17 may be adjustably supported to the support 11, and they may be adjusted until the recording pens 51 and 52 are centered at their respective desired base lines such as 63 or 64 shown in FIG. 4. Alternatively, setpoint means such as potentiometers 41 and 44 shown in FIG. 3 can be included with the amplifiers 53 and 55 for adjusting the signals to motors 54 and 56 until the recording pens 51 and 52 are centered over their respective base lines. Once these adjustments have been made, the vehicle is ready to begin traveling alongside the roadway to be sensed.

As changes can be made in the above described description and many different embodiments of this invention can be made without departing from the scope thereof, it is intended that all matter contained in the above description as shown on the accompanying drawings be interpreted as illustrative only and not in a limiting sense.

The embodiments of the invention in which an exclusive property or right is claimed are defined as follows:

1. An indicating system, to be moved along a roadway by a vehicle for indicating the profile of a finished or unfinished surface of the roadway, comprising:
   elevation sensing means, adapted to be supported on a support means, including at least first and second grade sensing means for generating respective first and second electrical signals proportional to the elevation of at least respective first and second points along said surface;
   grade and slope sensing and control means, responsive to predetermined grade and slope references, adapted to maintain said support means stabilized in grade and slope axes; and,
   indication means responsive to said first and second electrical signals for providing corresponding first and second proportional indications of said respective first and second points along said surface to indicate the profile of said surface.

2. The system of claim 1 wherein said indicating means comprises a strip chart recorder having first and second recording pens driven by said respective first and second electrical signals of said first and second grade sensing means for recording the profile along said first and second points and sensor means responsive to the movement of said system by said vehicle along said roadway for driving said chart.

3. The system of claim 2 wherein said grade and slope sensing and control means comprises a grade sensor responsive to an external grade reference and means responsive to said grade sensor adapted to adjust said support means in a grade axis and a slope sensor responsive to deviations of said support from a slope reference and means responsive to said slope sensor adapted to adjust said support means in a slope axis.

4. An indication system, to be moved along a roadway by a vehicle for indicating the profile of a finished or unfinished surface of the roadway comprising:
   support means;
   elevation sensing means supported on said support means including at least first and second grade sensing means for generating respective first and second electrical signals proportional to the elevation of at least respective first and second points along said surface;
   grade and slope sensing and control means, responsive to predetermined grade and slope references, to maintain said support means stabilized in grade and slope axes; and,
   indication means responsive to said first and second signals for providing corresponding first and second proportional indications of said respective first and second points along said surface.

5. The system of claim 4 wherein said indication means comprises a strip chart recorder having first and second recording pens driven by said respective first and second electrical signals of said first and second grade sensing means for recording the profile along said first and second points and sensor means responsive to the movement of said system by said vehicle along said roadway for driving said chart.

6. The system of claim 5 wherein said grade and slope sensing and control means comprises a grade sensor responsive to an external grade reference and means responsive to said grade sensor to adjust said support means in a grade axis and a slope sensor responsive to deviations of said support from a slope reference and means responsive to said slope sensor to adjust said support means in a slope axis.

* * * * *